US007410445B2

(12) United States Patent
Surewaard et al.

(10) Patent No.: US 7,410,445 B2
(45) Date of Patent: Aug. 12, 2008

(54) LOCKING MECHANISM FOR THE CRANKSHAFT OF AN INTERNAL COMBUSTION ENGINE

(75) Inventors: Erik Surewaard, Terheijden (NL); Don A. Kees, Basildon (GB); Daniel Kok, Klimmen (NL); Engbert Spijker, Nuth (NL); Mark Eifert, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 917 days.

(21) Appl. No.: 10/720,634

(22) Filed: Nov. 24, 2003

(65) Prior Publication Data

US 2005/0113211 A1 May 26, 2005

(51) Int. Cl.
*B60W 10/08* (2006.01)
*F16D 13/04* (2006.01)

(52) U.S. Cl. .......................................... 477/22; 192/42

(58) Field of Classification Search ..................... 477/3, 477/22, 83, 99; 123/179.3–179.4, 198 D, 123/198 R; 74/7 B–7 C, 6, 813 L; 192/41 R, 192/42, 17 R, 20–21
See application file for complete search history.

(56) References Cited

U.S. PATENT DOCUMENTS

| | | | | |
|---|---|---|---|---|
| 4,889,213 | A * | 12/1989 | Roller | 477/204 |
| 5,070,266 | A * | 12/1991 | Janczak et al. | 477/22 |
| 6,230,678 | B1 * | 5/2001 | Gracyalny et al. | 74/7 C |
| 6,453,864 | B1 * | 9/2002 | Downs et al. | 123/179.3 |
| 2002/0065165 | A1 * | 5/2002 | Lasson et al. | 477/3 |

FOREIGN PATENT DOCUMENTS

WO WO 01/48373 A1 7/2001

* cited by examiner

*Primary Examiner*—Roger Pang
(74) *Attorney, Agent, or Firm*—Dickinson Wright PLLC; Diana Brehob

(57) ABSTRACT

A locking mechanism (6) is provided to block the internal combustion engine (1) at prepositioned cranking angle after shutting down. Preferably, the crankshaft of the engine is positioned at a crankshaft angle that is favorable for cranking. Prepositioning of the crankshaft angle results in a lower first compression torque and therefore increases kinetic energy stored in the crankshaft lumped inertia. The required maximum torque of the cranking aid (2*a*, 2*b*, 2*c*) can therefore be reduced.

9 Claims, 4 Drawing Sheets

LOCKING MECHANISM FOR THE CRANKSHAFT OF AN INTERNAL COMBUSTION ENGINE

FIELD OF THE INVENTION

The present invention relates to a method for controlling shutdown and restart of an internal combustion engine, the engine being stopped in a predetermined rest position. The invention also relates to an internal combustion engine and control system for shutting down and restarting the engine having means for stopping the engine in a predetermined rest position.

BACKGROUND OF THE INVENTION

A method and a device for controlled shutdown and restart of an internal combustion engine are described in WO 01/48373 A1 in which the engine is actively or passively positioned at a predetermined crank angle at rest. The position is stored and later available at restart. The predetermined angle is then used to initiate cylinder-specific fuel injection and ignition.

Typically, an internal combustion engine is started by a starter motor, which brings the crankshaft to a minimum rotational speed. The motoring torque to rotate the engine varies as a function of crank angle due largely to the compression and expansion of air in the cylinders. The peaks in the motoring torque are overcome by the torque delivered by the starter and the inertial energy stored in the rotating components, namely the starter and engine.

The motoring torque increase as the temperature decreases. Thus, a starter with enough low-speed torque to overcome the motoring torque peaks at low temperature is desired. At warmer temperatures, a smaller electric motor would be sufficient. However, a larger motor is needed to cover the range of operating temperatures.

SUMMARY OF THE INVENTION

The inventors of the present invention have recognized that if the engine were shut down and restarted in a controlled manner, that motoring torque required to rotate the engine to the minimum cranking speed is reduced. This would allow reducing the capacity of the electric motor, even for cold weather starts.

A method of controlling shut down and restart of an internal combustion engine is disclosed in which the engine is stopped at a predetermined rest position. The predetermined rest position is a rest position at which the average motoring torque decreases during the first phase in the starting procedure.

By prepositioning the engine into a position with initially decreasing motoring torque, inertial energy can be stored in the spinning starter and engine before the first compression torque peak is reached. Thus, the peak can be overcome with less starter torque, i.e., the torque rating of the electric machine can be reduced. This allows the use of a smaller starter while guaranteeing at the same time reliable function even at low temperatures with high motoring torques.

In one embodiment, the predetermined rest position of the internal combustion engine is such that the motoring torque is at or just beyond its minimum value. Thus, a maximum amount of kinetic energy is stored in the system by the starter before the following peak motoring torque is reached.

In one embodiment, the engine is positioned in the predetermined rest position just after it has been shut down to take advantage of the lower motoring torque associated with warm operating temperatures. In this case, the prepositioning of the engine can be done by a starter, which due to battery power limitations at low temperatures, would be too weak for this movement in a cold state of the engine.

The predetermined rest position is verified by measuring the torque, or alternatively, the crank angle, during the positioning of the engine.

To prevent changes in crank angle due to a pressure in the cylinders of the internal combustion engine or due to a movement of the parked vehicle while in gear, the crankshaft of the engine is preferably locked in the rest position.

In principle, the described method is useful for every kind of starter that may be used for cranking an internal combustion engine. However, it is particularly advantageous if an Integrated Starter Generator (ISG) is used for cranking. Such an ISG can be operated like a starter motor that transforms electrical energy into mechanical energy or vice versa as a generator that produces electricity from mechanical movement. ISGs are typically coupled to the crankshaft with a rather low transmission ratio in comparison to normal starters. Therefore the motoring torque for starting determines the power required from ISGs. For this reason, ISGs particularly profit from a reduction of the motoring torque during engine start. Moreover, ISGs have a larger potential for storing kinetic energy due to their high inertial mass.

The invention also comprises a control system for the controlled shutdown and restart of an internal combustion engine. The system comprises means for shutting-down an internal combustion engine in a predetermined rest position. The control system determines a predetermined rest position at which the torque is decreasing during the first phase in the starting procedure. An advantage of the present invention is that such a system allows for a lighter starter, while at the same time guaranteeing a reliable cranking.

In one embodiment, the control system comprises a crank angle sensor, or, alternatively, a torque sensor. Such sensors allow a closed-loop control of the positioning of the internal combustion engine and a verification that a desired rest position is reached. The crank angle sensor is capable of measuring the absolute crank angle position at low or zero speed.

In one embodiment, the invention comprises an internal combustion engine with a locking mechanism coupled to its crankshaft for locking the internal combustion engine in a rest position. When activated, the locking mechanism blocks rotation of the crankshaft in one or in two directions. This prevents an undesirable change in the cranking angle between shut down and restart of the engine.

BRIEF DESCRIPTION OF THE FIGURES

The invention is described with reference to the accompanying figures, in which.

DETAILED DESCRIPTION

Figure 1:
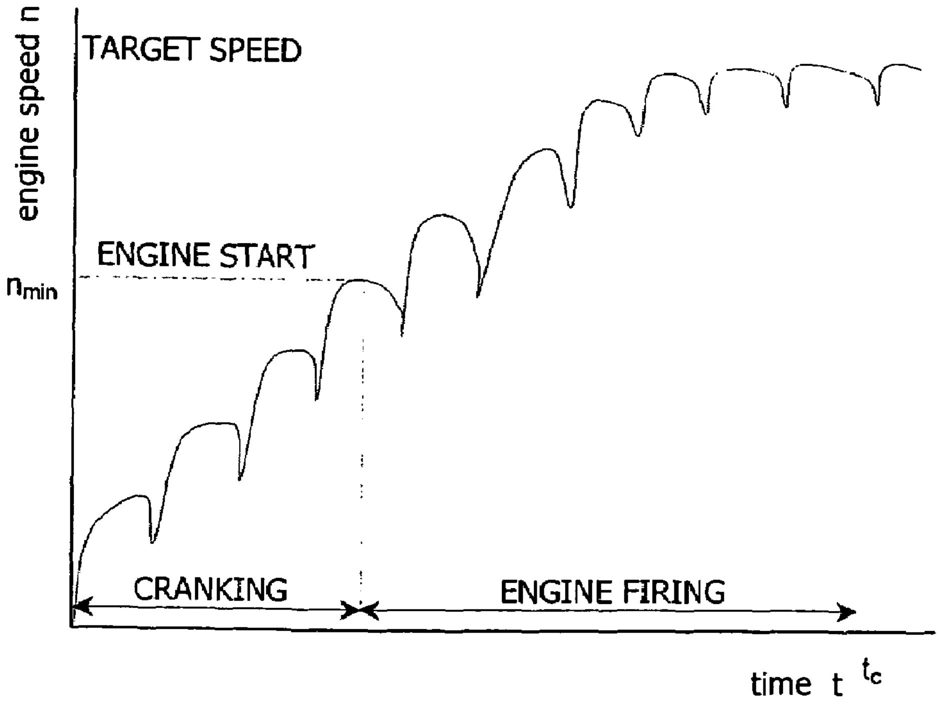
FIG. 1 shows a diagram of the engine speed vs. time during cranking.

The cranking process of an internal combustion engine is defined as motoring the engine by an external source (cranking device or starter like starter motor, Integrated Starter-Generator ISG, etc.) to a certain engine speed from which the engine can commence firing. FIG. 1 is a diagram of the engine speed (vertical axis) versus time (horizontal axis) for a typical cranking process. This process is a motored process, where the torque needed to accelerate the engine is delivered by the cranking device.

During the cranking process, the cranking device delivers a torque to:

a) Overcome the break-away torque: this is the static-friction torque of the engine.

b) Get through the first compression.

c) Reach a cranking speed at which the engine can successfully start firing. I.e., there is a minimum engine speed, $n_{min}$, from which combustion can take place in a stable manner.

d) Bring the engine to crank speed within a certain specified time $t_c$ (depending on customer perception and acceptance), that is dependent on temperature. At cold cranking temperatures, e.g., −29° C., the acceptable time will be much longer than at 20° C.

Figure 2:
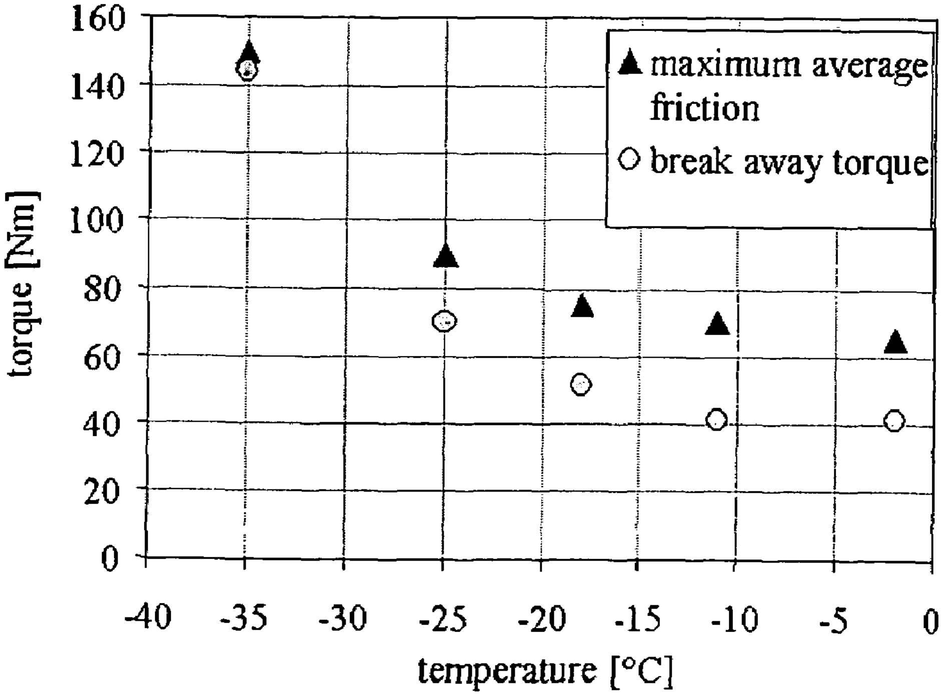
FIG. 2 shows engine friction torque vs. ambient temperature for an exemplary internal combustion engine.

At lower temperatures, friction is higher due to higher oil viscosity and smaller clearances between adjacent moving engine parts. At lower temperatures both the break-away torque and the friction torque increase. In FIG. 2, the measured break-away torque and average friction torque are displayed for a typical engine as function of temperature. This diagram shows that the maximum torque the cranking aid should deliver is determined by the lowest temperature at which the engine still has to be cranked successfully. Cold cranking, therefore, determines the maximum torque the cranking device has to deliver.

Figure 3:
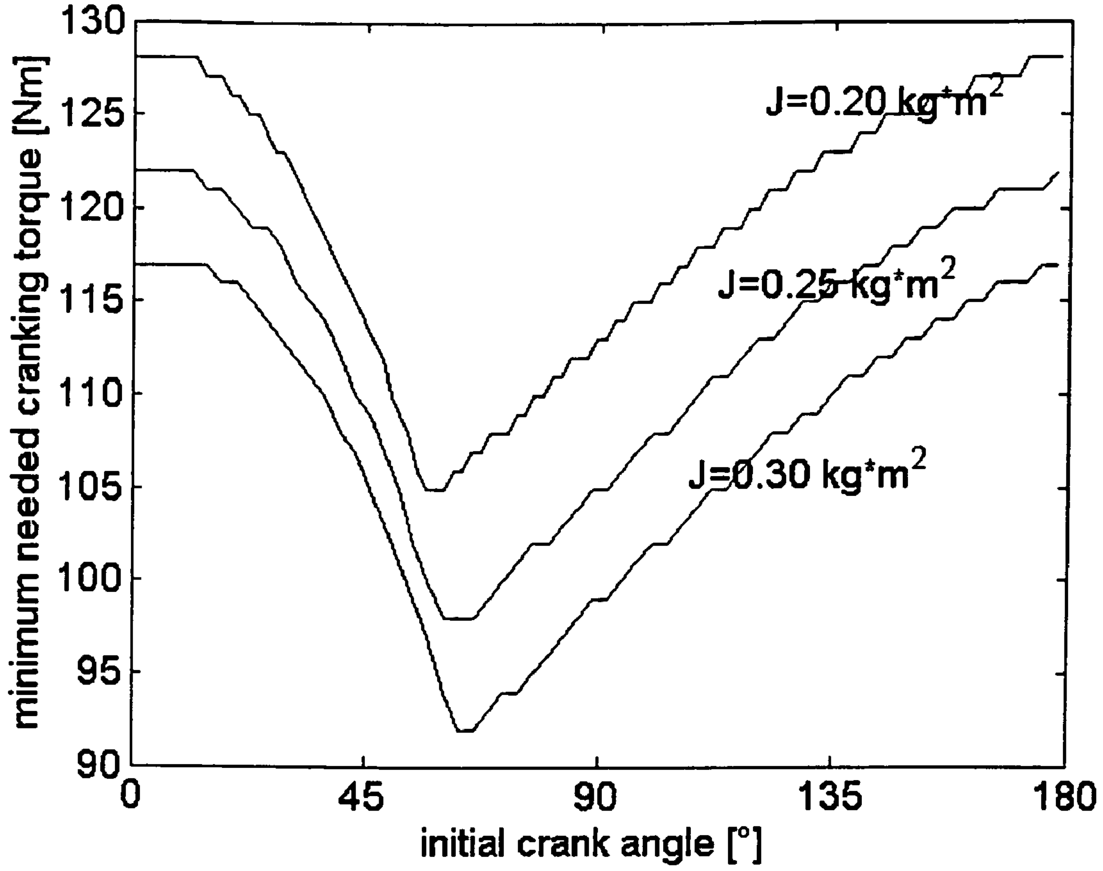
FIG. 3 shows the torque required to get through the first compression vs. the initial cranking angle for an exemplary internal combustion engine.

The break-away torque is determined by the engine design and is the minimum value the cranking device should deliver. The torque needed to move the engine through the first compression however is influenced by the initial position of the crankshaft. FIG. 3 depicts the motoring torque through the first compression at a cold cranking temperature of −29° C. for a typical engine as it is affected by initial cranking angle. The three curves correspond to three values J of the inertia moment of engine and starter. From FIG. 3 it is evident that the torque required to get through the first compression has a minimum at a certain optimal crank angle (roughly between 45° to 80°). This is the result of a lower compression pressure in the first compressing cylinder. This lower compression pressure results in a lower motoring torque. The residual torque of the cranking device is stored as kinetic energy in the lumped crankshaft inertia by accelerating it. This kinetic energy can be later used in a (i.e., during the maximum of the compression torque) by extracting torque from the lumped crankshaft inertia through deceleration.

Figure 4:
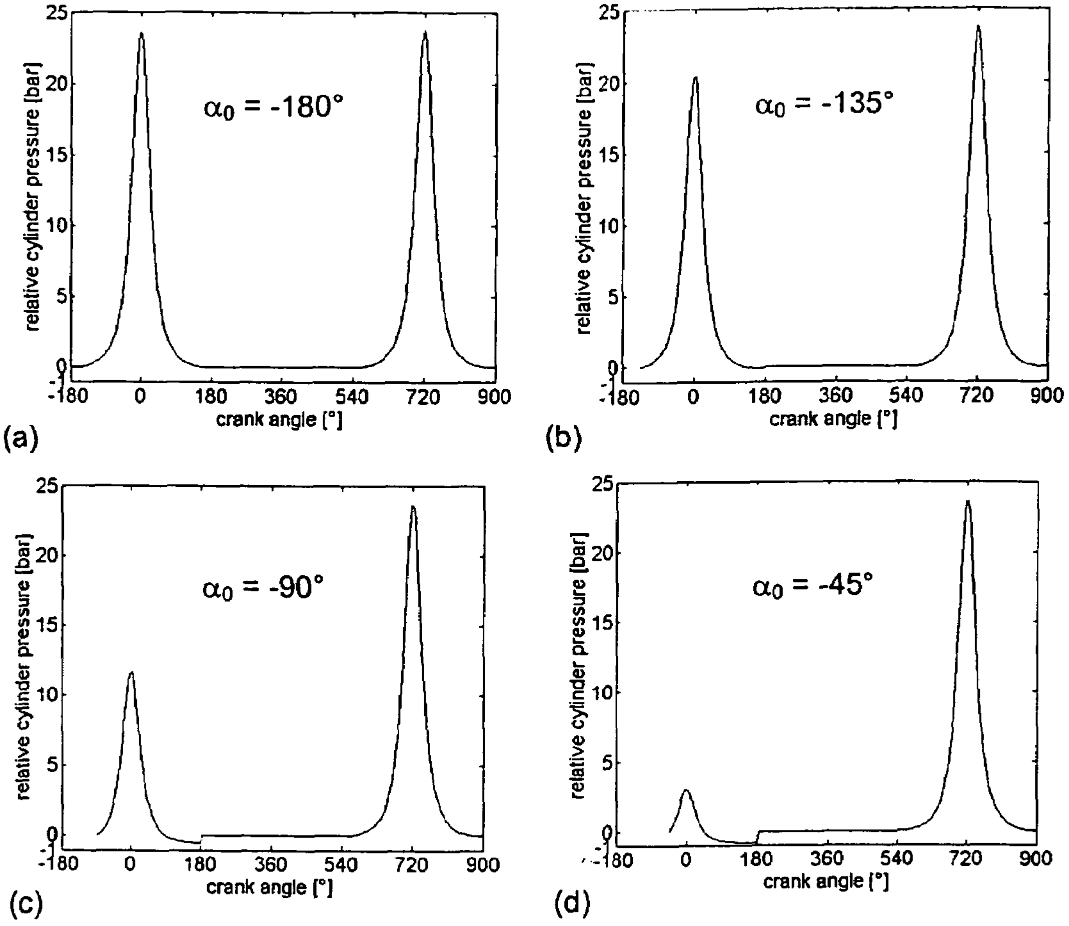
FIGS. 4*a-d* show the relative cylinder pressure at different initial crank angles.
Figure 5:
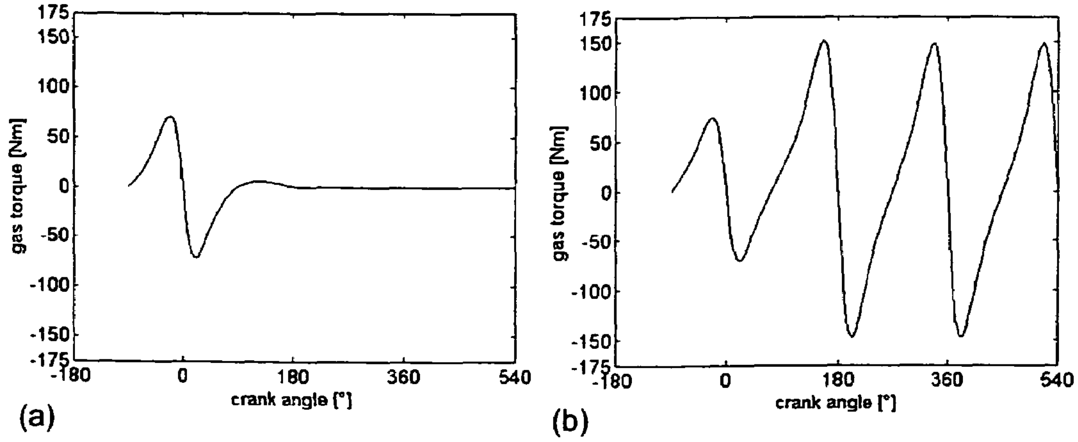
FIGS. 5*a-b* show gas torque during the first compression in one cylinder and in the whole engine, respectively.

The effects of the initial crankshaft position on the maximum cylinder pressure and torque are displayed in FIGS. 4 and 5, respectively. FIGS. 4*a* to 4*d* show the relative cylinder pressure (vertical axis) of a 4-cylinder engine versus crank angle (horizontal axis). The initial crank angle, $\alpha_0$, prior to cranking is −180° in FIG. 4*a*, −135° in FIG. 4*b*, −90° in FIG. 4*c*, and −45° in FIG. 4*d*, where $\alpha_0$ is 0° at TDC firing of cylinder 1. Comparison of the figures shows that cylinder pressure is at a minimum at an initial crank angle of −45°. FIGS. 5*a* and 5*b* are diagrams of the torque of a 4-cylinder engine during the first compression (initial crank angle: −90°) showing the contribution of a first cylinder (FIG. 5*a*) and the complete engine (FIG. 5*b*).

The optimal positioning of the initial crank angle does not only lower the torque needed to get through the first compression (improves cranking success) but also influences the time needed to crank the engine. The lower first compression peak results in faster engine acceleration, which has implications for Stop-Start operation (hot cranking).

Figure 6:
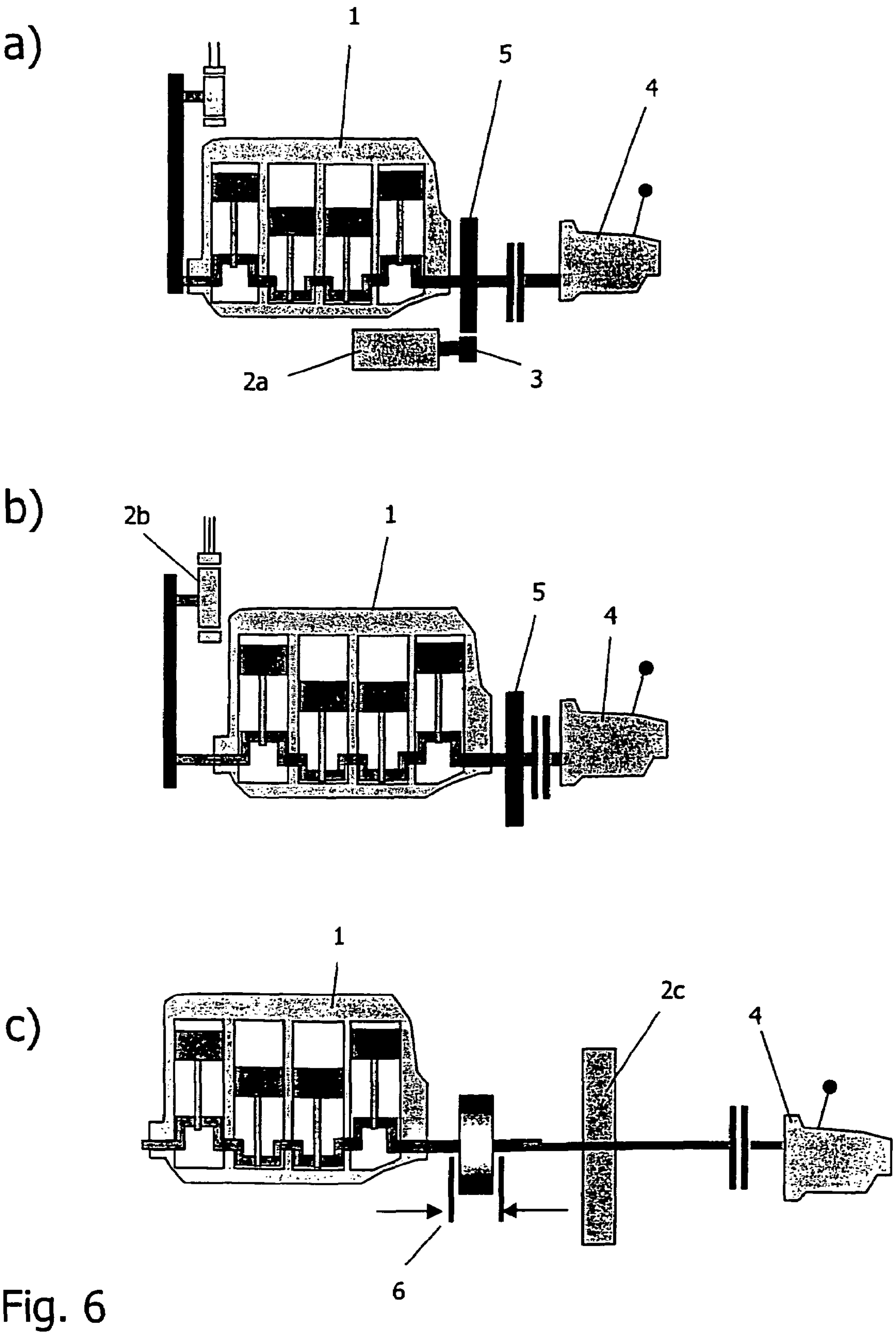
FIGS. 6*a-c* show an internal combustion engine with a conventional starter, an ISG coupled via a belt, and an ISG directly coupled to the crankshaft, respectively.

FIGS. 6*a* to 6*c* depict three types of starters for an internal combustion engine 1. FIG. 6*a* shows a conventional starter motor 2*a* that is coupled to the crankshaft via a pinion 3 and a ring gear 5, the transmission ratio of ring gear to pinion being typically, about 14:1. Moreover, a clutch/gearbox 4 is shown. FIG. 6*b* shows an Integrated Starter-Generator (ISG) 2*b* that is coupled via a belt to the internal combustion engine 1, the pulley ratio of this coupling being about 3:1. Moreover, a flywheel 5 and a clutch/gearbox 4 are shown. FIG. 6*c* depicts an ISG 2*c* that is integrated into the flywheel between internal combustion engine 1 and clutch/gearbox 4. The transmission ratio is 1:1 in this case.

FIG. 6*c* shows a crankshaft lock 6. A crankshaft lock has the advantage of maintaining a prepositioned optimal crankshaft starting angle or any crankshaft angle that has been determined and stored before the engine is shut down. Prepositioning is best done immediately before engine shutdown while it is still warm to minimize the required electrical energy. However, an angle near a torque peak is unstable, because the torque applied to the crankshaft by compressed gas may rotate the crankshaft out of the optimal position after the prepositioning is completed. Therefore, a mechanism is required that allows the crankshaft to be positioned by the starter and then to hold the preset angle against the forces of the compressed gas. One such mechanism is a one-way clutch, which allows rotation in only one direction when it is engaged. In the case of a vehicle with a manual transmission and a one-way clutch, the prepositioned crankshaft angle may still be changed if the vehicle is shoved while it is parked and in gear. Mechanism 6 of FIG. 6*c* locks the crankshaft in both directions.

Besides prepositioning the crankshaft, it is also desirable to determine and save the crank angle position at shut down without actively influencing it. The stored crank angle can then be used to shorten starting times, because it eliminates rotating the crank several rotations for the purposes of determining crank position. In the current state of the art, the engine is rotated a number of times before a determination is possible. When the crank angle at engine shutdown is stored for use when restarting, the crankshaft is preferably locked to prevent rotation in both directions. Locking mechanism 6 of FIG. 6*c* accomplishes this. A locking mechanism 6 that prevents rotation in both directions is realized by pins or ratchets that engage with a gear on the crankshaft or by a friction belt.

When starting a vehicle in cold weather, an ISG 2*b*, 2*c* is at a disadvantage compared with a conventional starter 2*a*. In the case of a crankshaft mounted ISG 2*c*, there is no torque multiplying gear or pulley ratio between the electric machine and crankshaft, and in the case of a belt driven ISG 2*b*, the maximum ratio is dictated by packaging constraints and inertial effects of the electric machine on the drive train during acceleration of the vehicle. While a belt-driven ISG 2*b* may have a maximum pulley ratio to the crankshaft of about 3:1, gear ratios of 14:1 are possible with a conventional starter motor 2*a*. The power rating and maximum torque of an ISG must overcome motoring torque peaks that are encountered when the engine is cranked. As explained above, the peaks are associated with a reciprocating component of the motoring torque that depends on crank angle. The ISG is sized to overcome the total motoring torque, which increases as temperature decreases. A vehicle encounters these very low operating temperatures seldom. For the ambient temperatures that a vehicle usually encounters, the motoring torque that an ISG has to overcome is much lower than the extreme cold weather values. Hence, the electric machine is usually sized at a much higher torque rating than is normally required. It is therefore desirable to lower the required torque during cold weather starting by maximizing the inertial energy stored in the rotating crankshaft and starter-alternator before the first compression is reached.

Engine motoring torque and friction are lower when the engine is warm, and so prepositioning is accomplished with a minimum in electrical energy immediately after the engine is shut down while it is still warm. The optimal position just after a torque peak is determined by sensing the crank angle or, alternatively, by determining motoring torque as the crankshaft is being positioned. Sensing crank angle is accomplished by a position sensor that operates at low or zero rotational speed, and such may be available for control of ISGs with permanent-magnet synchronous (PSM) electric machines.

A further advantage in prepositioning the crankshaft is in reducing the number of rotations to restart a combustion engine. In the current state of the art, a minimum number of rotations are necessary for the Engine Control Module to observe signals coming from the crankshaft position sensor to ascertain the position. If the absolute crank angle is known in advance when the engine is started, fuel delivery and ignition could be initiated without first rotating the crankshaft to determine crank angle.

We claim:

1. A method for shutting down an internal combustion engine, comprising:

stopping the engine in a predetermined rest position wherein the predetermined rest position is such that motoring torque is decreasing during a first phase of restart; and locking the engine in said predetermined rest condition via a locking mechanism.

2. The method of claim 1 wherein the locking mechanism prevents engine rotation.

3. The method of claim 2 wherein said locking mechanism comprises pins that engage with a gear coupled to the crankshaft.

4. The method of claim 2 wherein said locking mechanism comprises ratchets that engage with a gear coupled to the crankshaft.

5. The method of claim 2 wherein said locking comprises a friction belt that engages with the crankshaft.

6. The method of claim 1 wherein the looking mechanism allows the engine to rotate in one direction only.

7. The method of claim 6 wherein said locking mechanism comprises a freewheel clutch.

8. The method of claim 7 wherein said freewheel clutch is positioned between a gearbox and the engine.

9. The method of claim 6 wherein said locking mechanism comprises ratchets that engage with a gear coupled to the crankshaft.

* * * * *